United States Patent
Um et al.

(10) Patent No.: US 8,787,271 B2
(45) Date of Patent: Jul. 22, 2014

(54) METHOD AND DEVICE FOR COMMUNICATION BETWEEN DEVICES WITH DIFFERENT TRANSMISSION COVERAGE

(75) Inventors: Jung Sun Um, Daejeon (KR); Gwangzeen Ko, Daejeon (KR); Sung-Hyun Hwang, Daejeon (KR); Myung Sun Song, Daejeon (KR); Chang-Joo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 655 days.

(21) Appl. No.: 12/942,491

(22) Filed: Nov. 9, 2010

(65) Prior Publication Data
US 2011/0149889 A1  Jun. 23, 2011

(30) Foreign Application Priority Data

Dec. 17, 2009  (KR) .................. 10-2009-0125879
Feb. 1, 2010  (KR) .................. 10-2010-0009005

(51) Int. Cl.
*H04W 4/00* (2009.01)
*H04W 72/12* (2009.01)
*H04W 84/04* (2009.01)

(52) U.S. Cl.
CPC ........ *H04W 72/1205* (2013.01); *H04W 84/045* (2013.01)
USPC ........... 370/329; 370/328; 370/338; 370/348; 455/11.1; 455/15; 455/422.1

(58) Field of Classification Search
None
See application file for complete search history.

(56) References Cited

U.S. PATENT DOCUMENTS

| | | | |
|---|---|---|---|
| 7,587,212 B2 | 9/2009 | Kang et al. | |
| 7,680,141 B2 * | 3/2010 | Miyake et al. | 370/428 |
| 7,894,388 B2 * | 2/2011 | Visotsky | 370/329 |
| 8,103,217 B2 * | 1/2012 | Kwon et al. | 455/63.1 |
| 8,218,469 B2 * | 7/2012 | Zheng | 370/315 |
| 2008/0045141 A1 * | 2/2008 | Suga | 455/7 |
| 2008/0107075 A1 * | 5/2008 | Ramachandran et al. | 370/331 |
| 2009/0147706 A1 * | 6/2009 | Yu et al. | 370/277 |
| 2009/0202013 A1 | 8/2009 | Sebastian | |
| 2010/0290416 A1 * | 11/2010 | Ko et al. | 370/329 |

FOREIGN PATENT DOCUMENTS

| | | |
|---|---|---|
| KR | 1020070038657 A | 4/2007 |
| KR | 1020090054956 A | 6/2009 |
| KR | 2009-0077825 A | 7/2009 |
| KR | 1020090125361 A | 12/2009 |

(Continued)

*Primary Examiner* — Ian N Moore
*Assistant Examiner* — Latresa McCallum
(74) *Attorney, Agent, or Firm* — Rabin & Berdo, P.C.

(57) ABSTRACT

Provided is a large range management device (LRMD) of managing a communication between a plurality of small range devices (SRDs) and a plurality of large range devices (LRDs), the SRDs and the LRDs being located in a single cell and having different transmission coverage, the LRMD including an access slot allocation unit to allocate an SRD access slot to a radio resource for a downlink, to enable a first SRD to request an association from a network, a selection unit to select a communication relay device for relaying relay data of the first SRD, a relay slot allocation unit to allocate at least one SRD relay slot to a radio resource for an uplink, to enable the communication relay device to relay the relay data to a second SRD or another LRD, and a receiving unit to receive the relay data based on the at least one SRD relay slot.

13 Claims, 21 Drawing Sheets

(56) References Cited

FOREIGN PATENT DOCUMENTS

| WO | WO-2007-036161 | A1 | 4/2007 |
| WO | WO-2007-147231 | A1 | 12/2007 |
| WO | WO-2008-057388 | A1 | 5/2008 |
| WO | WO-2009/009385 | A1 | 1/2009 |

* cited by examiner

METHOD AND DEVICE FOR COMMUNICATION BETWEEN DEVICES WITH DIFFERENT TRANSMISSION COVERAGE

CROSS-REFERENCE TO RELATED APPLICATION(S)

This application claims the benefit of Korean Patent Application Nos. 10-2009-0125879 and 10-2010-0009005, respectively filed on Dec. 17, 2009 and Feb. 1, 2010, in the Korean Intellectual Property Office, the disclosures of which are incorporated herein by references.

BACKGROUND

1. Field of the Invention

The present invention relates to a communication device and method, and more particularly, to a communication device and method for communicating between devices having different transmission coverage.

2. Description of the Related Art

In a Cognitive Radio (CR) system, a maximum transmission power available for each communication device may be determined based on regulations. In this case, maximum power values of communication devices may be different in a single cell and thus, all communication devices may not independently communicate.

Communication devices having different transmission coverage may exist in a single communication cell and thus, may need a data transmission method between the communication devices having different transmission coverage.

SUMMARY

An aspect of the present invention provides a communication method and procedure that support a communication between communication devices having different communication coverage According to an aspect of the present invention, there is provided a large range management device (LRMD) of managing a communication between a plurality of small range devices (SRDs) and a plurality of large range devices (LRDs), the SRDs and the LRDs being located in a single cell and having different transmission coverage, the LRMD including an access slot allocation unit to allocate an SRD access slot to a radio resource for a downlink, to enable a first SRD to request an association from a network, a selection unit to select, from among the plurality of LRDs, a communication relay device for relaying relay data of the first SRD, a relay slot allocation unit to allocate at least one SRD relay slot to a radio resource for an uplink, to enable the communication relay device to relay the relay data to a second SRD being located outside transmission coverage of the first SRD or another LRD being located outside the transmission coverage of the first SRD, and a receiving unit to receive the relay data based on the at least one SRD relay slot.

According to an aspect of the present invention, there is provided an SRD including a relay request unit to transmit, to an LRMD, a communication request signal requesting to communicate with a LRD being located outside a transmission coverage and/or another SRD being located outside the transmission coverage, and a transmitting unit to receive an allocated radio resource for the downlink from the LRMD in response to the transmission, and to transmit relay data after performing synchronization with the allocated radio resource.

According to an aspect of the present invention, there is provided an LRD including a detector to detect whether a relay request signal from a first SRD exists in a radio resource for a downlink allocated by an LRMD, and a relay data transmitting unit to decode relay data to be transmitted to a second SRD being located outside a transmission coverage of the first SRD or another LRD being located outside the transmission coverage of the first SRD, and to transmit the decoded relay data to an SRD relay slot among radio resources for an uplink allocated by the LRMD when the relay request signal is detected.

According to an aspect of the present invention, there is provided an LRD including a resource allocation unit to allocate at least one SRD access slot, at least one SRD slot, and at least one SRD relay slot, to a packet of at least one of a time domain (TDM), a frequency domain (FDM), and a code domain (CDM), and a transmitting unit to transmit, based on at least one SRD relay slot, relay data of a first SRD to a second SRD being located outside a transmission coverage of the first SRD or another LRD being located outside a transmission coverage of the first SRD.

According to an aspect of the present invention, there is provided an SRD that associates with a network using at least one SRD access slot allocated by an LRD, and transmits relay data using an SRD slot allocated by the LRD.

According to an aspect of the present invention, there is provided an LRMD controlling method that manages a communication between a plurality of SRDs and a plurality of LRDs, the SRDs and the LRDs being located in a single cell and having different transmission coverage, the method including allocating an SRD access slot to a radio resource for a downlink, to enable a first SRD to request an association from a network, selecting, from among the plurality of LRDs, a communication relay device for relaying relay data of the first SRD, allocating at least one SRD relay slot to a radio resource for an uplink, to enable the communication relay device to relay the relay data to a second SRD being located outside the transmission coverage of the first SRD or another LRD being located outside the transmission coverage of the first SRD, and receiving, from the communication relay device, the relay data based on the at least one SRD relay slot.

According to an aspect of the present invention, there is provided a SRD controlling method including transmitting, to an LRMD, a signal requesting to communicate with an LRD being located outside a transmission coverage and/or with another SRD being located outside the transmission coverage, receiving a radio resource for a downlink allocated from the LRMD in response to the transmission, and transmitting, to the LRMD, relay data after performing synchronization with the allocated radio resource.

Additional aspects, features, and/or advantages of the invention will be set forth in part in the description which follows and, in part, will be apparent from the description, or may be learned by practice of the invention.

EFFECT

According to embodiments, communication devices having different transmission coverage may communicate without interference.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
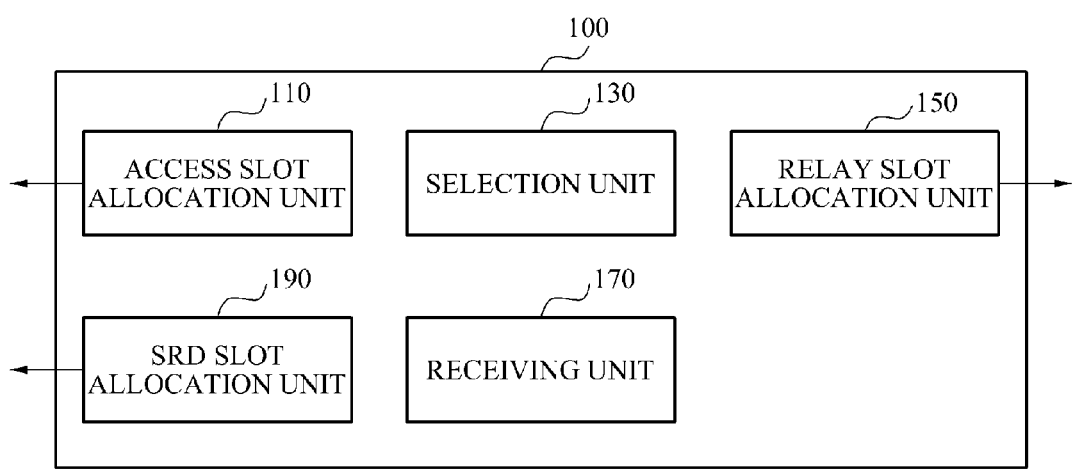
FIG. 1 is a block diagram illustrating a large range management device (LRMD) according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

In a Cognitive Radio (CR) system, a maximum transmission power available for communication device may be determined by regulations based on features of the communication device. In this case, available maximum power values of communication devices may be different in a single cell and thus, all communication devices may not communicate with each other.

Therefore, a communication resource may be allocated to enable a communication device having a relatively large communication coverage, namely, a large range device (LRD), to relay data of an adjacent communication device having a relatively small communication coverage, namely, a small range device (SRD), in a system including communication devices having difference communication coverage.

In this case, each communication device may opportunistically allocate the communication resource, or, when a communication device managing a network exists, the communication resource may be controlled by the corresponding communication device.

The SRD may receive a signal of an LRD, but may not be capable of transmitting a signal to the LRD and thus, an LRD for relaying data of the SRD may be opportunistically selected or may be controlled by a communication device managing a system or a network.

FIG. 1 illustrates a large range management device (LRMD) 100 according to an embodiment of the present invention.

Referring to FIG. 1, the LRMD 100 may manage a communication between a plurality of SRDs and a plurality of LRDs, the SRDs and LRDs being located in a single cell and having different transmission coverage, and may include an access slot allocation unit 110, a selection unit 130, a relay slot allocation unit 150, and a receiving unit 170. The LRMD 100 may further include an SRD slot allocation unit 190.

A first SRD may intend to request an association with a network via a communication relay device selected from among the plurality of LRDs, and the access slot allocation unit 110 may allocate an SRD access slot to a radio resource for a downlink to enable the first SRD to request the association with the network from an LRMD based on association request data or a signal having a pattern, namely, association request signal pattern.

When an SRD attempts association with a network at an initial time, a resource for transmitting an association request signal pattern or an association request data may be used. The SRD access slots may act as the resource. When the SRD transmits the association request signal pattern or the association request data using the SRD access slot, adjacent LRD may detect the association request signal pattern or the association request data transmitted using the SRD access slots.

The communication relay device may be an LRD that may relay a signal or may relay data from an SRD, among the LRDs.

The selection unit 130 may select, from among LRDs, the communication relay device for relaying relay data of the first SRD.

The selected communication relay device may relay data of the first SRD to another SRD being located outside the transmission coverage of the first SRD or to another LRD being located outside the transmission coverage of the first SRD, when transmission distances between communication devices are different based on a transmission power, an antenna pattern, other communication control conditions, and the like.

The relay data may be data to be transmitted, via the communication relay device selected after the SRD associates with the network, to another SRD or to the other LRD.

The selection unit 130 may select the communication relay device based on at least one of information associated with a distance from the first SRD, channel state information, and data transmission capacities of the plurality of LRDs.

The relay resource allocation unit 150 may allocate at least one SRD relay slot to a radio resource for an uplink, to enable the communication relay device selected by the selection unit 170 to relay the relay data to a second SRD being located outside the transmission coverage of the first SRD or to the LRMD 100 or another LRD being located outside the transmission coverage of the first SRD.

The adjacent LRD that receives, from the SRD, the association request signal or the association request data may relay, to the LRMD 100, the association request signal of the SRD transmitted using the SRD access slot, or may relay, to the LRMD, the relay data transmitted using an SRD slot.

In this case, the relay resource allocation unit 150 may discriminate between the relay data and a relay request signal based on a signal type of at least one SRD relay slot.

The relay slot allocation unit 150 may include the relay data in a data burst of the radio resource for the uplink to relay the relay data.

The at least one SRD relay slot may include a plurality of partial slots, and the communication relay device selected by the selection unit 130 may relay the relay data based on one of the plurality of partial slots.

The receiving unit 170 may receive the relay data from the communication relay device selected by the selection unit 130, using the SRD relay slot.

Allocation of the SRD access slot and the SRD relay slot will be described with reference to FIG. 5.

The SRD slot allocation unit 190 may allocate an SRD slot to the radio resource for the downlink, and may transmit, based on the allocated SRD slot, the relay data to the communication relay device selected by the selection unit 130.

When the communication relay device transmits, to the LRMD 100, an association request signal pattern or association request data transmitted by the SRD for requesting association via the SRD access slot, the LRMD 100 that receives the association request signal pattern or the association request data may allocate an SRD slot to enable the SRD to transmit the relay data without collision with data allocated to the radio resource for the downlink.

When the first SRD requests a peer-to-peer (P2P) communication with a third communication device within the transmission coverage of the first SRD, the SRD slot allocation unit 190 may allocate an SRD slot to one of a radio resource for an uplink and the radio resource for the downlink.

In this case, the relay data being relayed via the communication relay device may include information associated with a communication environment between the first SRD and the third SRD.

Figure 2:
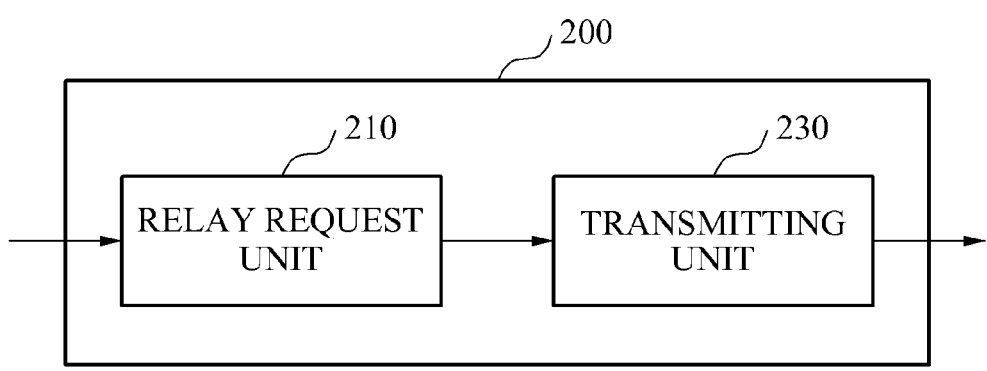
FIG. 2 is a block diagram illustrating a small range device (SRD) according to an embodiment of the present invention.

FIG. 2 illustrates an SRD 200 according to an embodiment of the present invention. Referring to FIG. 2, the SRD 200 may include a relay request unit 210 and a transmitting unit 230.

The relay request unit 210 may transmit, to an LRMD, a signal requesting to communicate with an LRD being located outside transmission coverage and with another SRD being located outside the transmission coverage.

The transmitting unit 230 may receive, from the LRMD, an allocated radio resource for a downlink in response to the transmission, and may transmit the relay data after performing synchronization with the allocated radio resource.

The transmitting unit 230 may perform synchronization with the downlink, may receive map data, and may transmit, based on the map data, the relay data by including the relay data in an SRD slot.

Figure 3:
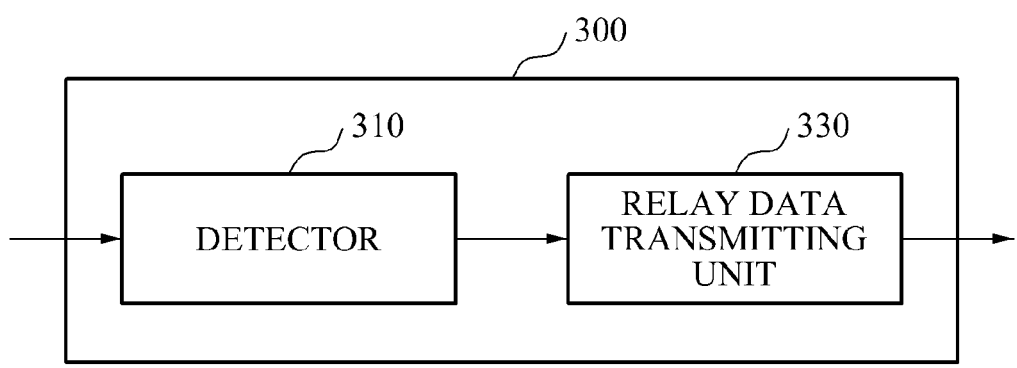
FIG. 3 is a block diagram illustrating a large range device (LRD) according to an embodiment of the present invention.

FIG. 3 illustrates an LRD 300 according to an embodiment of the present invention. Referring to FIG. 3, the LRD 300 may include a detector 310 and a relay data transmitting unit 330.

The detector 310 may detect whether a relay request signal from a first SRD exists in a radio resource for a downlink allocated by an LRMD.

When the relay request signal is detected, the relay data transmitting unit 330 may decode relay data to be transmitted to a second SRD being located outside a transmission range of the first SRD or to the LRMD or another LRD being located outside a transmission range of the first SRD, and may transmit the decoded relay data to an SRD relay slot among radio resources for an uplink.

The relay data transmitting unit 330 may decode and may transmit the relay data after determining that an SRD access slot is allocated to the radio resource for the downlink.

The relay data transmitting unit 330 may transmit the relay request signal to the second SRD, or to the LRMD or the other LRD based on at least one of a relay slot or a data burst of a radio resource of the LRD 300.

Figure 4:
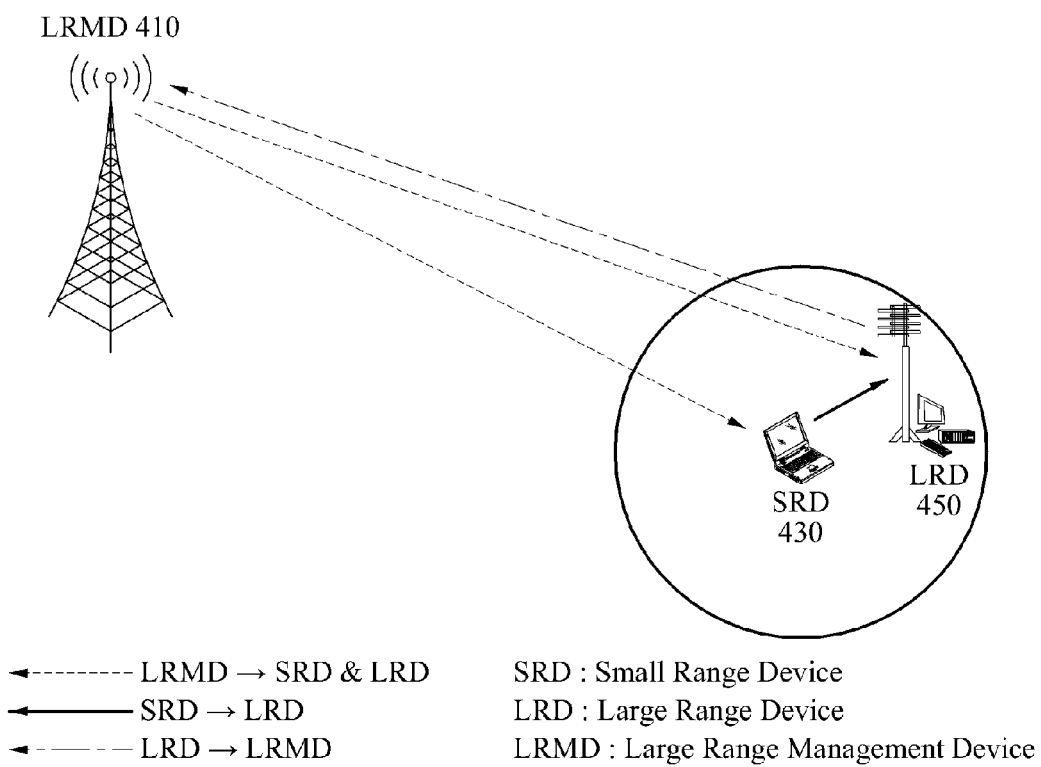
FIG. 4 is a diagram illustrating processes among an LRMD, an SRD, and an LRD.
Figure 5:
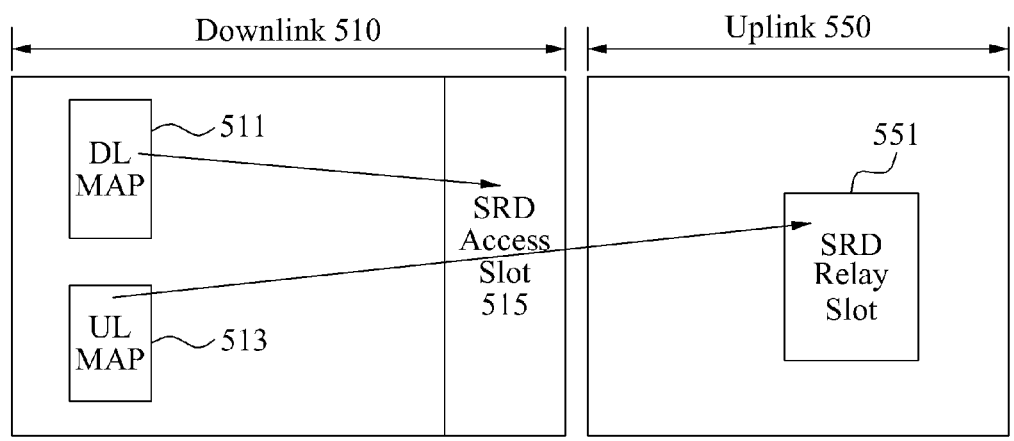
FIG. 5 is a diagram illustrating allocation of SRD access slot and SRD relay slot according to an embodiment of the present invention.

FIG. 4 illustrates processes among an LRMD 410, an SRD 430, and an LRD 450, and FIG. 5 illustrates allocation of an SRD access slot 515 and an SRD relay slot 551 according to an embodiment of the present invention.

Referring to FIGS. 4 and 5, when the SRD 430 attempts an initial association with a network, an operation of each device is as follows.

The LRMD 410 may manage a communication between a plurality of SRDs and a plurality of LRDs, the SRDs and the LRDs being located in a single cell and having different transmission coverage. The LRMD 410 may be a device for managing a resource or the network, and may be constituted by, for example, an LRD.

The SRD 430 may be a communication device that may receive a signal of another LRD but may not transmit a signal to the LRD 450.

The LRD 450 relaying the signal of the SRD may not retransmit the signal of the other LRD to the SRD and thus, may the LRD 450 relaying the signal may be different from a conventional relay communication device.

The LRMD 410 may allocate the SRD access slot 515 to a radio resource for a downlink 510 of at least one of a time domain (TDM), a frequency domain (FDM), and a code domain (CDM), to enable the SRD to periodically or randomly transmit a signal requesting association with other communication devices.

The downlink 510 may be defined as a section where the LRMD 410 transmits data to another communication device, for example, an SRD or an LRD. An SRD slot may be allocated to enable the SRD to transmit relay data to the communication relay device without colliding with data allocated to the radio resource for the downlink.

When the LRMD 410 allocates the SRD access slot 515 to the radio resource for the downlink 510, the LRMD 410 may form and allocate the SRD access slot 515 so that a collision between the data that is transmitted by the LRMD 410 is not incurred and is allocated to the radio resource for the downlink and relay data to be transmitted to the communication relay device that may relay the data of the SRD.

The SRD access slot 515 may be mapped by a downlink (DL) map 511 included in the radio resource for the downlink, and may be allocated. The SRD relay slot 551 may also be mapped by an uplink (UL) map included in the radio resource for the downlink and may be allocated.

The LRMD 410 may allocate the SRD relay slot 551 to at least one of a TDM, a FDM, and a CDM of a radio resource for an uplink 550, so that the relay data of the SRD 430 is relayed and is received. The uplink 550 may be defined as a section where other communication devices excluding the LRMD 410, such as an LRD or an SRD, may transmit a signal to the LRMD 410.

The LRMD 410 may form the SRD relay slot 551 or may determine a signal type of a signal transmitted to the SRD relay slot 551, to discriminate between relay data and a relay request signal to receive at least one relay data or at least one relay request signal.

The SRD 430 may perform synchronization with the downlink 510 of the LRMD 410. The SRD 430 may perform synchronization of the SRD access slot 515 with the allocated downlink 510 to transmit an association request signal.

The association request signal transmitted by the SRD 430 may include a predetermined signal or a predetermined symbol, to enable another SRD receiving relayed signal to perform synchronization and to estimate a channel.

The association request signal transmitted by the SRD 430 may be in a form of a predetermined signal pattern or may be in a form of relay data including a predetermined or known signal, to enable another LRD to decode the transmitted relay data.

After determining whether the SRD access slot 515 is allocated in the downlink 510, the LRD 450 associated with the cell may determine whether an association request signal pattern exists in the corresponding access resource to decode the transmitted data.

When the association request signal pattern exists in the corresponding SRD access slot 515, the LRD 450 may transmit the decoded data or information indicating whether the associated request signal pattern is detected in the SRD relay slot.

When a time for detecting the association request signal pattern or decoding the data is significantly expended, the LRD 450 may use another SRD relay slot that is allocated after the currently allocated SRD relay slot 551.

The association request signal detected, by the LRD 450, from the SRD access slot 515 may be relayed to another SRD or LRDs based on the SRD relay slot 551.

In this case, the SRD 430 may receive the relay data or the relay request signal of the SRD 430 transmitted to the SRD relay slot 551 to determine that the SRD's 430 own signal is being transmitted.

When the relay request signal is not accurately determined due to a collision with another signal, the SRD 430 may prepare transmission of a relay request signal using a subsequent frame.

The LRMD 410 may determine that at least one SRD requests association based on a signal received using the SRD relay slot 551.

The LRMD 410 may discriminate a relay request signal and relay data transmitted to the SRD relay slot, and may receive at least one relay request signal or at least one relay data.

The LRMD 410 may allocate an SRD slot to at least one of a TDM, a FDM, and a CDM, to enable the SRD 430 to transmit data without interference of another signal, the SRD 430 attempting association by using a frame subsequent to a frame including the relay request signal or the relay data.

Operations to be performed after the SRD 430 attempts an initial association with a network will be described with reference to FIGS. 6 through 9. The like elements may have like functions throughout FIGS. 6 through 9 and thus, a redundant description for each element will be omitted.

Figure 6:
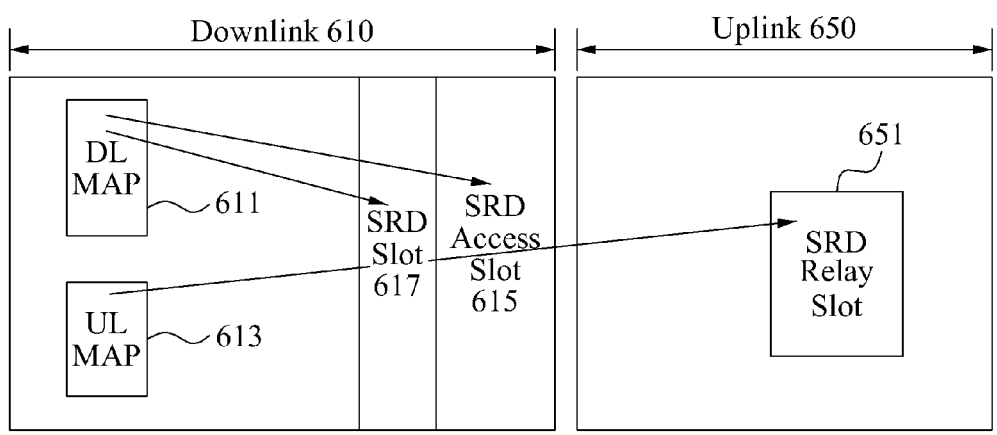
FIG. 6 is a diagram illustrating slot allocation and data transmission according to an embodiment of the present invention.

FIG. 6 illustrates slot allocation and data transmission according to an embodiment of the present invention.

Referring to FIG. 6, an SRD slot 617 may be allocated, and relay data may be transmitted using an SRD relay slot 651.

The LRMD 410 that determines an association request of the SRD 430 may allocate an SRD slot 615 to a downlink 610 to enable a signal to be relayed and to be received. The SRD 430 may transmit, to the communication relay device, relay data to be transmitted to another SRD or to the LRMD 410 or another LRD.

When the LRMD 410 allocates an SRD slot 617 to the downlink 610, the LRMD 410 may allocate the SRD slot 617 to a radio resource for the downlink 610 to prevent collision between data that is transmitted by the LRMD 410 and is allocated to the radio resource for the downlink and relay data of the SRD.

Allocation of the SRD slot 617 may also be mapped by a DL map 611 allocated to the radio resource of the downlink 610.

The LRMD 410 may allocate, to the radio resource for the downlink 610, the SRD slot 617 and the SRD access slot 615.

The LRMD 410 may allocate, to a radio resource for an uplink 650, the SRD relay slot 651, to enable a signal to be relayed and received.

Figure 7:
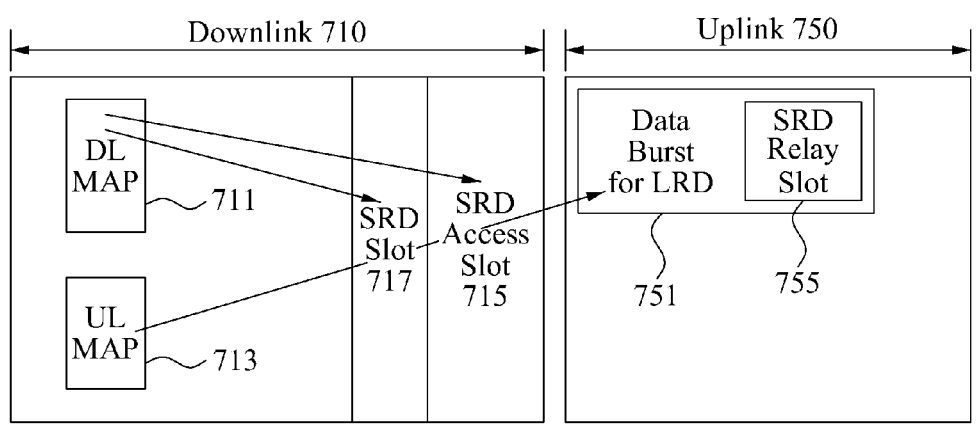
FIG. 7 is a diagram illustrating slot allocation and data transmission according to another embodiment of the present invention.

In this case, when the LRMD 410 allocates an SRD relay slot to the radio resource for the uplink, the LRMD 410 may divide the SRD relay slot into slots 751 and 755 having different features to enable different signals to be independently transmitted as illustrated in FIG. 7.

FIG. 7 illustrates slot allocation and data transmission according to another embodiment of the present invention.

Referring to FIG. 7, an SRD slot 717 is allocated to a radio resource for a downlink 710, and an SRD relay data 755 is transmitted using a data burst 751 of a radio resource for an uplink 750.

Figure 8:
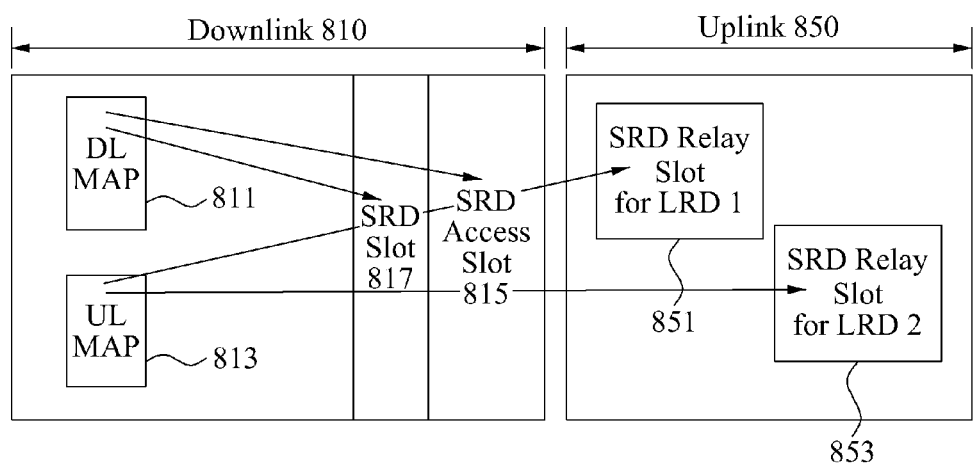
FIG. 8 is a diagram illustrating slot allocation and data transmission according to still another embodiment of the present invention.

The LRMD 410 may allocate at least one SRD relay slot, such as SRD relay slot 851 and 853, to a radio resource for an uplink 850 as illustrated in FIG. 8.

FIG. 8 illustrates slot allocation and data transmission according to still another embodiment of the present invention.

Referring to FIG. 8, an SRD slot 817 is allocated to a radio resource for a downlink 810, and relay data is transmitted using a plurality of SRD relay slots 851 and 853 in a radio resource for the uplink.

In this case, the SRD 430 may perform synchronization with the downlink 810 to receive information associated with DL map 811.

The SRD 430 may transmit, using the SRD slot 817 defined in the DL map 811, relay data to be transmitted to another SRD or to an LRMD or another LRD, to a communication relay device.

An LRD selected as a communication relay device for transmitting data to the other SRD may transmit a relay request signal and relay data to a domain allocated for transmitting data of the LRD or at least one of the SRD relay slots 851 and 853 allocated to an uplink 850.

The LRMD 410 may receive the relay request signal or the relay data using one of a data transmission domain of a radio resource for the uplink 850 and the SRD relay slots 851 and 853.

Figure 9:
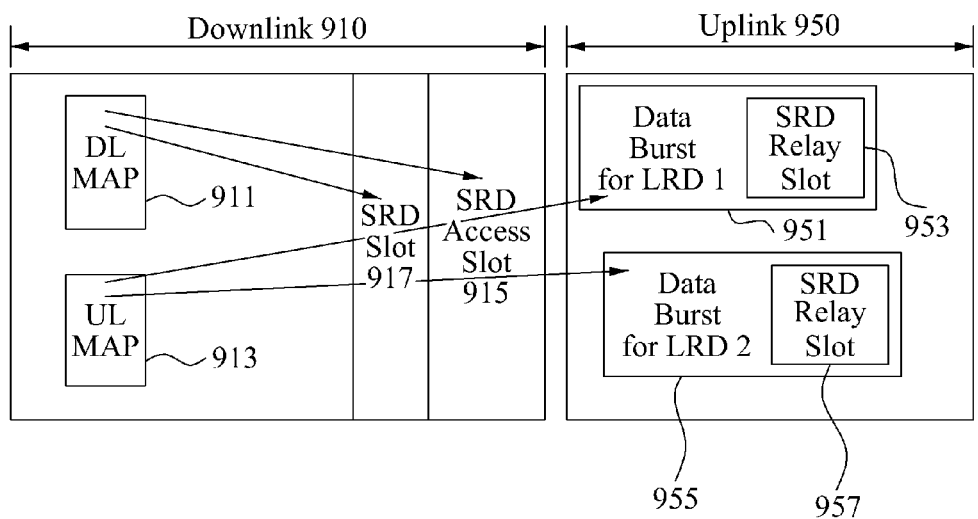
FIG. 9 is a diagram illustrating slot allocation and data transmission according to yet another embodiment of the present invention.

The LRMD 410 may define an uplink, to transmit relay data 953 and 957 to data bursts 951 and 955 of the LRD 450 as illustrated in FIG. 9.

FIG. 9 illustrates slot allocation and data transmission according to yet another embodiment of the present invention.

Referring to FIG. 9, an SRD slot may be allocated to a radio resource for a downlink 910, and relay data 953 and 957 may be transmitted using a plurality of data bursts 951 and 955 allocated to a radio resource for an uplink 950.

The LRMD 410 may allocate at least one data burst, such as the data burst 951 and the data burst 955, by which the relay request signal or the relay data may be transmitted.

The LRMD 410 may select the LRD 450 that may relay a signal of the SRD 430 that requests association.

The LRMD 410 may set at least one LRD 450 as the relay communication device to enable a plurality of LRDs to transmit the same relay request signal and the same relay data.

The LRMD 410 may set, as the relay communication device 450 for relaying relay data of the SRD 430, at least one LRD satisfying a predetermined condition, for example, information associated with a distance, channel state information, and data transmission capacities of an LRD, from among an LRD that may not perform data transmission and reception with a current LRMD, an LRD that may perform data transmission and reception with the current LRMD and may not have difficulty in transmitting and receiving data even through performing relay, an LRD that may have sufficient channel capacities, an LRD that may be closest to the SRD, an LRD that may have a superior communication channel environment with the SRD, and an LRD that may have a superior communication channel with the LRMD 410.

In this case, the LRMD 410 may have a reception gain by collecting signals of the SRD 430 from at least one communication relay device.

The same data may be received from a plurality of communication relay devices based on a diversity effect. Therefore, although a signal received from a single communication relay device may have an error, when signals received from remaining communication relay devices are accurate signals, the LRMD 410 may receive an accurate signal by collecting the accurate signals.

Although an inaccurate signal is received due to an insufficient transmission power, when a signal power becomes relatively greater by collecting transmission powers of remaining signals, the initially intended accurate signal may be decoded.

Figure 10:
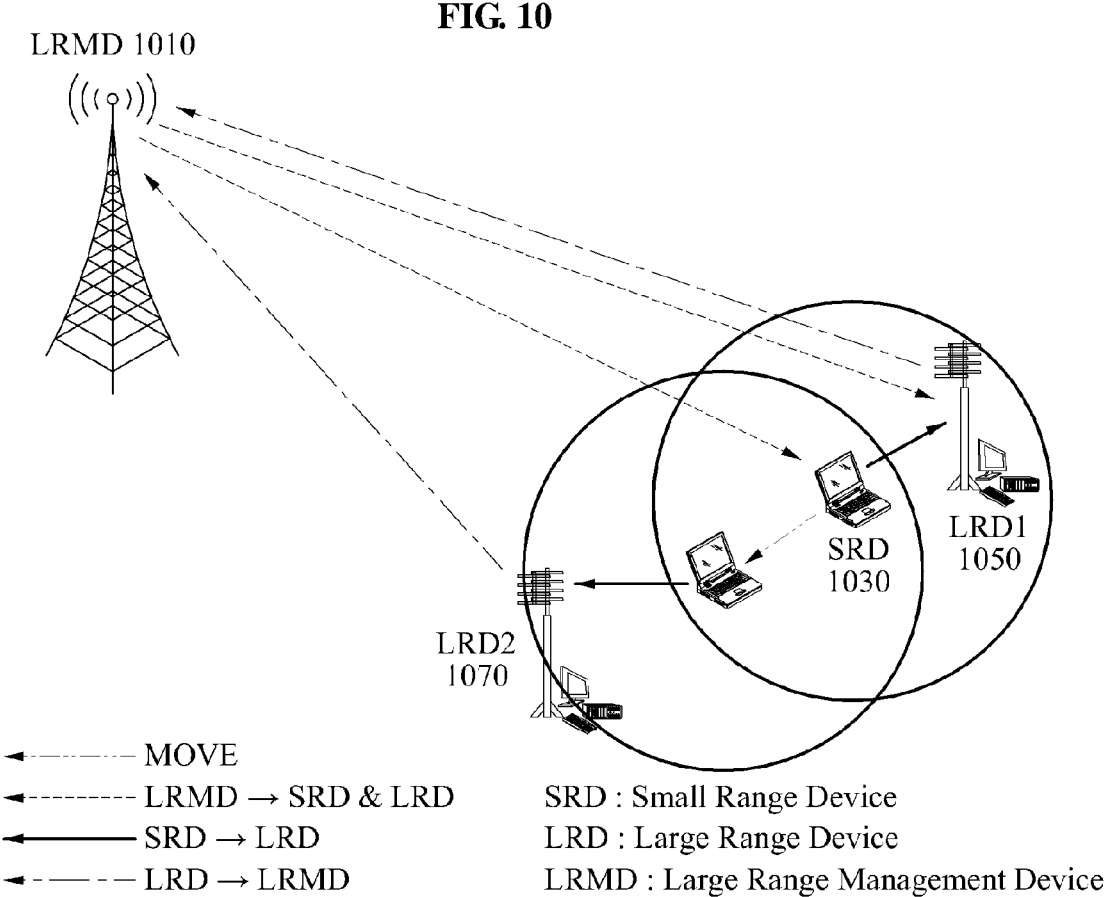
FIG. 10 is a diagram illustrating a case where a moving SRD exists according to an embodiment of the present invention.

FIG. 10 illustrates a case where a moving SRD exists according to an embodiment of the present invention.

Referring to FIG. 10, when an LRMD 1010 receives a message indicating that an SRD 1030 has a mobility, or the SRD 1030 is detected from LRDs 1050 and 1070 being located in a different location, the LRMD 1010 may determine that the SRD 1030 has a mobility.

The LRMD 1010 may allocate, as an additional relay communication device, an LRD 1050 being located in a location where the SRD 1030 is accessible or a new LRD 1070 that detects the SRD 1030.

At least one LRD, such as the LRD 1050 and the LRD 1070, may transmit a relay request signal and relay data of the SRD 1030, using at least one radio resource for an uplink.

When a signal of the SRD 1030 is not detected or a received SRD signal has an error, the LRD 1050 may stop performing as the relay communication device or may report the result to the LRMD 1010.

When the signal of the SRD 1030 is not detected or the signal of the received SRD 1030 has the error, the LRMD 1010 may disqualify the LRD 1050 for the relay communication device.

When the SRD is a communication device having a mobility, the SRD may be handed-off between adjacent LRDs or may perform a cooperative communication.

Figure 11:
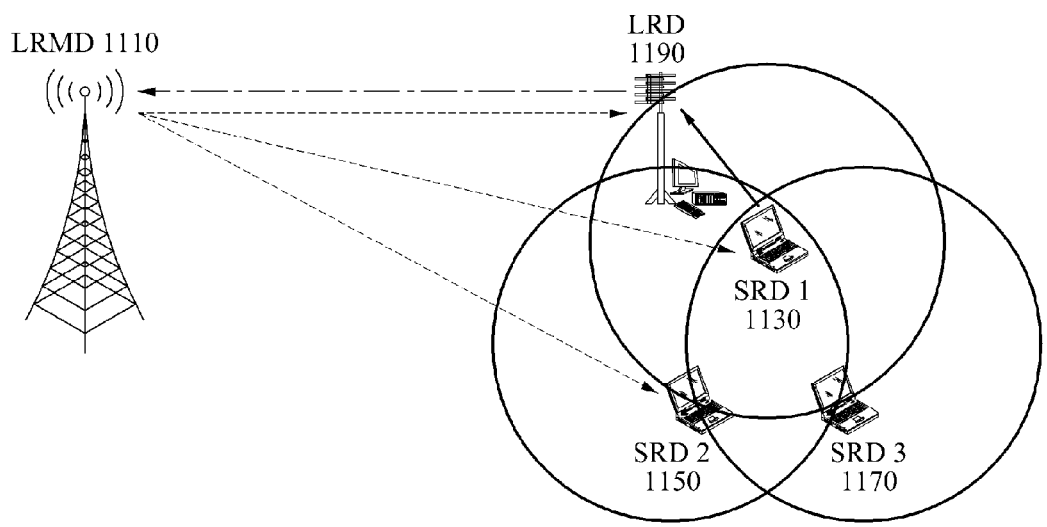
FIG. 11 is a diagram illustrating a case where an SRD group is formed according to an embodiment of the present invention.

FIG. 11 illustrates a case where a SRD group is formed according to an embodiment of the present invention. An operation of forming the SRD group will be described with reference to FIGS. 12 through 15.

Figure 12:
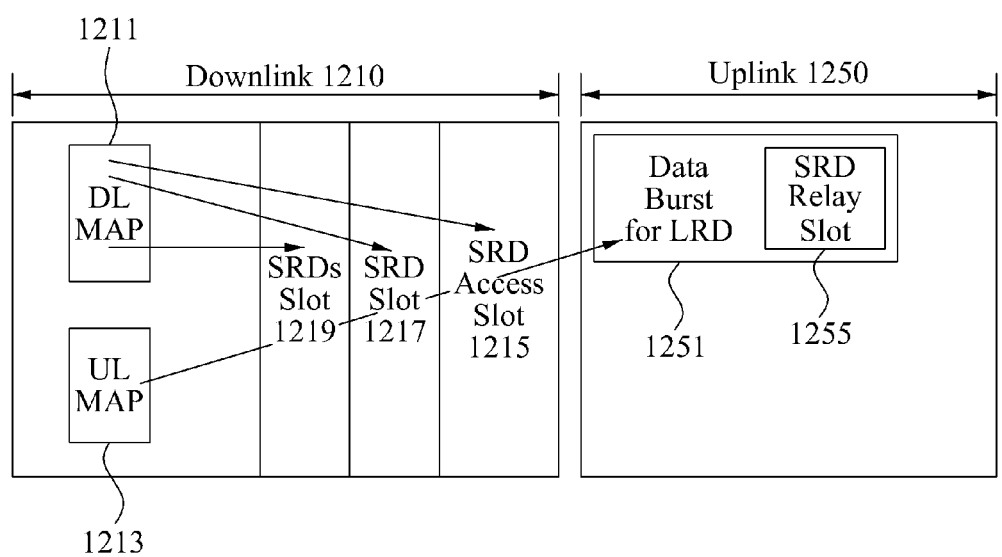
FIGS. 12 and 13 are diagrams illustrating slot allocation and data transmission when an SRD group is formed according to an embodiment of the present invention.
Figure 13:
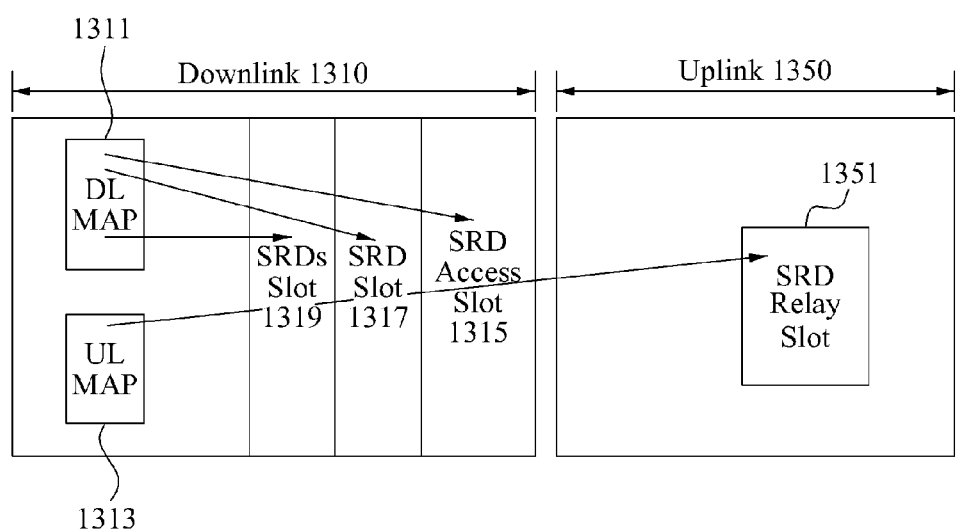

FIGS. 12 through 15 illustrate slot allocation and data transmission when an SRD group is formed according to an embodiment of the present invention Referring to FIGS. 12 and 13, when the SRD group is formed, SRD slots, such as SRD slots 1217, 1219, 1317, and 1319, may be allocated to a radio resource for a downlink, such as a downlink 1210 and a downlink 1310.

Figure 14:
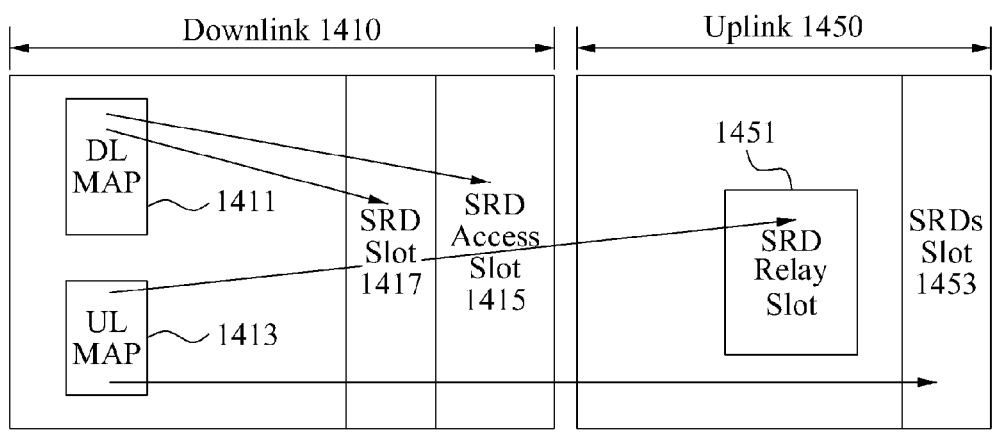
FIGS. 14 and 15 are diagrams illustrating slot allocation and data transmission when an SRD group is formed according to another embodiment.
Figure 15:
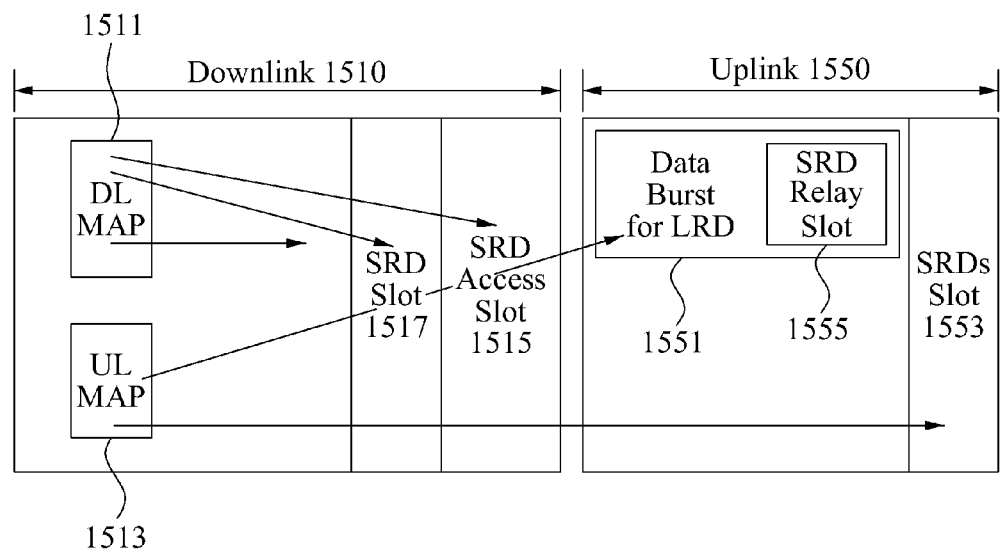

Referring to FIGS. 14 and 15, when SRD group is formed, SRD slots, such as SRD slots 1417, 1453, 1517, and 1553, may be allocated to a radio resource for a downlink, such as a downlink 1410 and a downlink 1510, and to a radio resource for an uplink, such as an uplink 1450 and an uplink 1550.

When at least one SRD, such as an SRD 1130, an SRD 1150, and an SRD 1170, requests a Peer-to-Peer (P2P) communication, the LRMD 1110 may allocate the SRD slot, such as the SRD slots 1217, 1219, 1317, and 1319, to the radio resource for the downlink, such as the downlink 1210 and the downlink 1310, of at least one of a TDM, a FDM, and a CDM of FIG. 12 or FIG. 13.

The LRMD 1110 may allocate the SRD slot, such as the SRD slots 1417, 1453, 1517, and 1553, to the downlink, such as the downlink 1410 and the downlink 1510, and the uplink, such as the uplink 1450 and the uplink 1550, of at least one of a TDM, a FDM, and a CDM of FIG. 14 or FIG. 15.

The SRD group including the SRDs 1130, 1150, and 1170 may include an SRD that may communicate with an LRD 1190, an SRD that may receive a signal of an LRMD, and an SRD that may not communicate with the LRD 1190 and the LRMD 1110.

The LRMD 1110 may allocate at least one SRD slot when at least one SRD group exists.

The LRMD 1110 may manage an SRD group using a representative SRD of the SRD group. For example, an SRD 1 1130 may manage an SRD 2 1150 and SRD 3 1170 included in the SRD group.

The LRMD 1110 may manage at least one SRD or all SRDs 1130, 1150, and 1170 included in the SRD group.

The SRDs of the SRD group may perform a communication within allocated STD slots.

The LRMD 1110 may request various communication environment state information of the SRD group in a form of relay data or in a form of a relay request signal.

A network excluding a separate LRMD may be formed based on a packet scheme, which will be described with reference to FIGS. 16 through 19.

Figure 16:
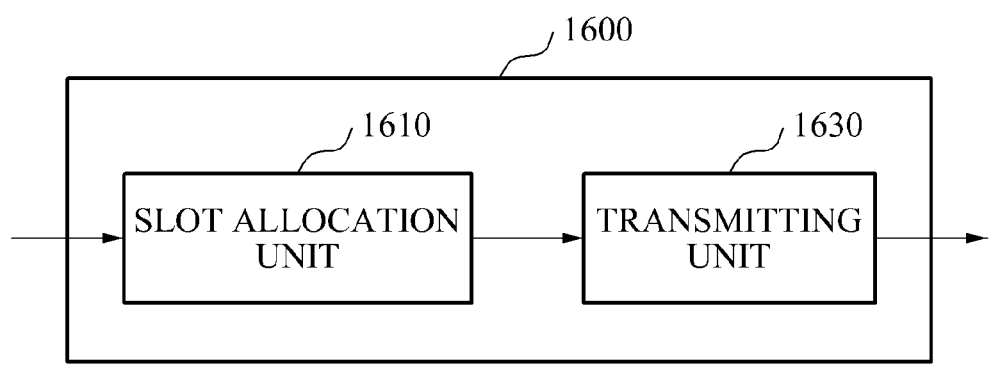
FIG. 16 is a block diagram illustrating an LRD according to an embodiment of the present invention.

FIG. 16 illustrates an LRD according to an embodiment of the present invention. Referring to FIG. 16, according to an embodiment where data is transmitted based on a packet scheme in a network that may not include a management communication device, an LRD 1600 may include a slot allocation unit 1610 and a transmitting unit 1630.

The slot allocation unit 1610 may allocate at least one SRD access slot, at least one SRD slot, and at least one SRD relay slot, to a packet of at least one of a TDM, an FDM, and a code area.

In this case, when a relay request signal or relay data is received using the at least one SRD access slot, the SRD slot allocation unit 1610 may allocate at least one SRD slot to a first SRD.

The transmitting unit 1630 may transmit the relay data of the first SRD to a second SRD being located outside a transmission coverage of the first SRD or to another LRD being located outside the transmission coverage of the first SRD, using the at least one SRD relay slot.

In the embodiment where the data is transmitted based on the packet scheme in the network that may not include the management communication device, the SRD that operates together with the LRD 1600 may associate with a network based on the at least one SRD access slot allocated from the LRD 1600, and may transmit data based on the SRD slot allocated from the LRD.

Figure 17:
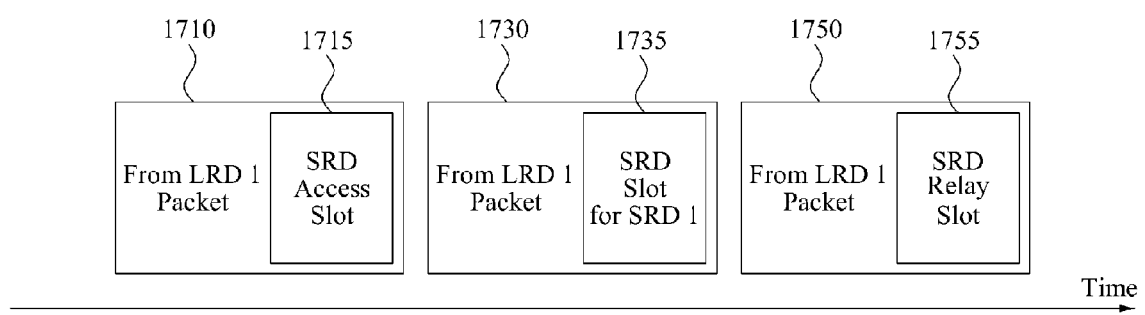
FIG. 17 is a diagram illustrating slot allocation and data transmission in a network where a separate LRMD does not exist according to an embodiment of the present invention.
Figure 18:
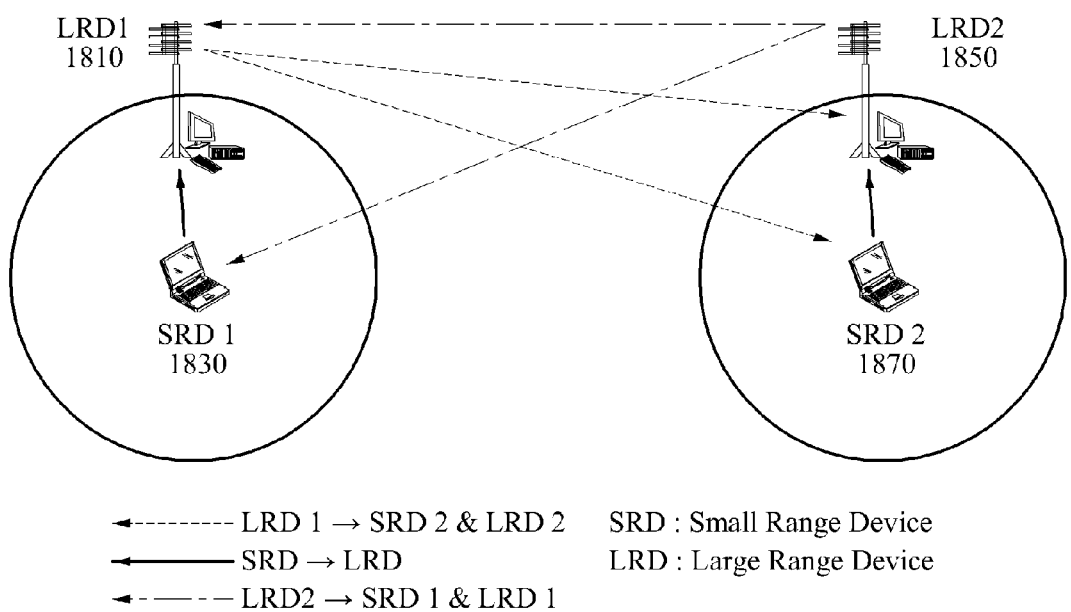
FIG. 18 is a diagram illustrating communication between communication devices in the network of FIG. 17 where the separate LRMD does not exist.

FIG. 17 illustrates slot allocation and data transmission in a network where a separate LRMD does not exist according to an embodiment of the present invention, and FIG. 18 illustrates a communication between communication devices in the network of FIG. 17 where the separate LRMD does not exist.

Figure 19:
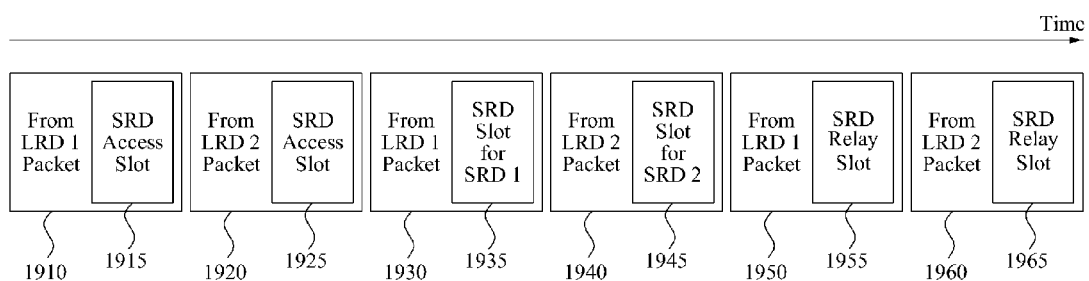
FIG. 19 is a diagram illustrating, over time, a transmission and reception process in a network where an LRMD does not exist according to an embodiment of the present invention.

FIG. 19 illustrates, over time, a transmission and reception process in the network where the LRMD does not exist according to an embodiment of the present invention.

Referring to FIG. 17, an SRD may associate with a network or may transmit data using an LRD packet of an LRD.

Referring to FIG. 18, a plurality of SRDs may transmit and receive a signal using an LRD 1810.

Referring to FIG. 19, a process that the plurality of SRDs transmits and receives a signal over time using an LRD is described.

The LRD 1810 may allocate at least one SRD access slot, such as SRD access slots 1715, 1915, and 1925, at least one SRD slot, such as SRD slots 1735, 1935, and 1945, at least one SRD group slot, and at least one SRD relay slot, such as SRD relay slots 1755, 1955, and 1965, to at least one domain among a TDM, an FDM, and a CDM of a packet transmitted by the LRD 1810, such as packets 1710, 1730, and 1750.

The SRD, such as an SRD1 1830 and an SRD 2 1870, may be associated with the network using at least one SRD access slot, such as the SRD access slots 1715, 1915, and 1925.

The LRD, such as an LRD1 1810 and an LRD2 1850, that receives a relay request signal or relay data using the SRD access slot, such as an SRD access slot 1915 and an SRD access slot 1925, may allocate an SRD slot, such as SRD slots 1935 and 1945.

The SRD, such as the SRD 1 1830 and the SRD 2 1870, may transmit data to the allocated SRD slot.

The LRD 1810 may transmit, based on the SRD relay slot, SRD relay slots 1955 and 1965, a signal to at least one other LRD, such as an LRD 1850, or to at least one other SRD, such as SRDs 1830 and 1870.

Figure 20:
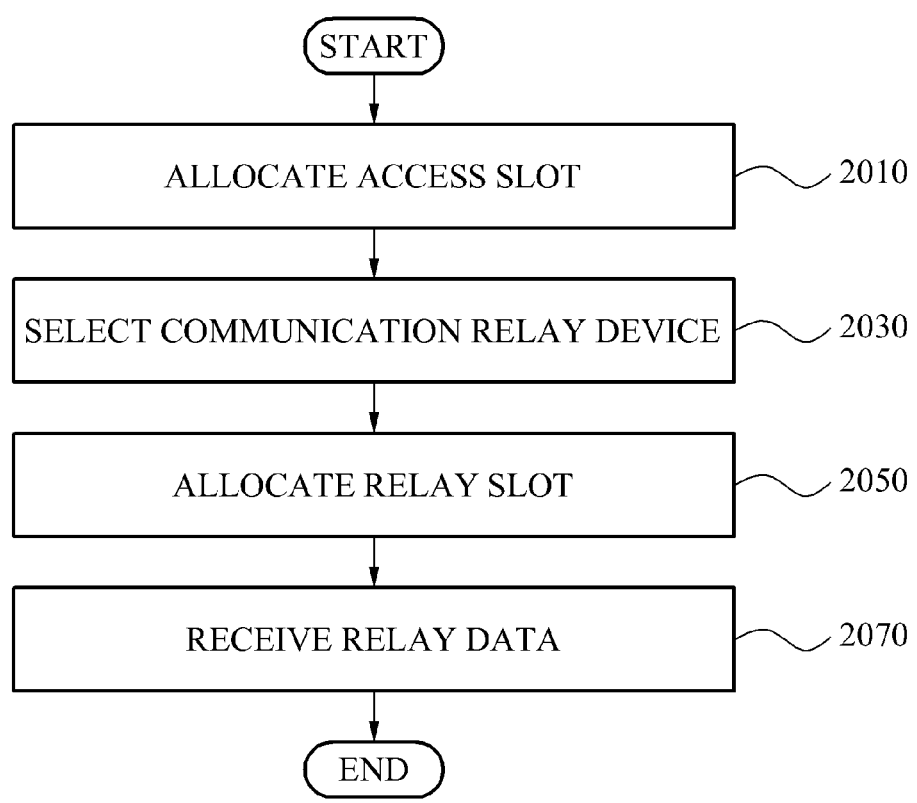
FIG. 20 is a flowchart illustrating a controlling method of an LRMD according to an embodiment of the present invention.

FIG. 20 illustrates a controlling method of an LRMD according to an embodiment of the present invention.

The LRMD may control a communication between a plurality of SRDs and a plurality of LRDs, the SRDs and the LRDs being located in a single cell and having different transmission coverage, and the controlling method of the LRMD will be described with reference to FIG. 20.

In operation 2010, an SRD access slot is allocated to a radio resource for a downlink to enable a first SRD to request association with a network. Subsequently, the LRMD selects, from among the plurality of LRDs, a communication relay device for relaying relay data of the first SRD in operation 2030.

In this case, the selection of the communication relay device may be performed based on at least one of information associated with a distance from the first SRD, channel state information, and data transmission capacities of the plurality of LRDs.

In operation 2050, the LRMD may allocate at least one SRD relay slot to a radio resource for an uplink to enable the communication relay device selected in operation 2030 to relay the relay data to a second SRD being located outside transmission coverage of the first SRD or another LRD being located outside transmission coverage of the first SRD.

In operation 2070, the LRMD receives the relay data from the communication relay device based on the at least one SRD relay slot allocated in operation 2050.

In this instance, in operation 2050, the at least one SRD relay slot may include a plurality of partial slots, and the relay data may be relayed based on one of the plurality of partial slots.

Figure 21:
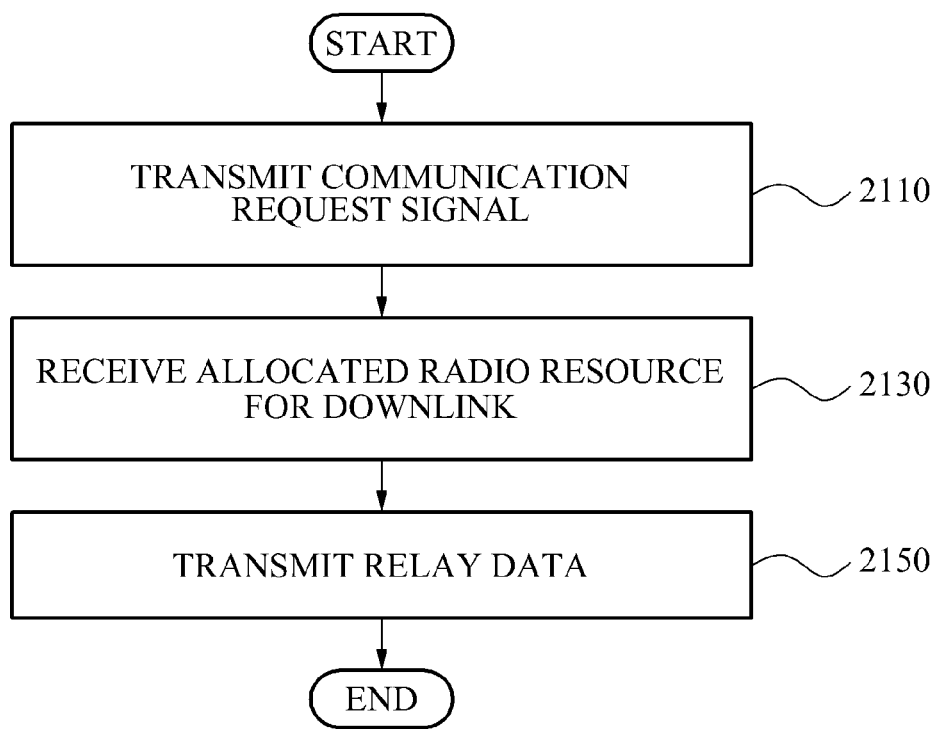
FIG. 21 is a flowchart illustrating a controlling method of an SRD according to an embodiment of the present invention.

FIG. 21 illustrates a controlling method of an SRD according to an embodiment of the present invention.

Referring to FIG. 21, a signal requesting to communicate with an LRD being located outside a transmission coverage or with another SRD being located outside the transmission coverage is transmitted to an LRMD in operation 2110, a radio resource for a downlink is allocated from the LRMD in operation 2130, and relay data is transmitted to the LRMD by performing synchronization with the radio resource allocated in operation 2130.

The controlling method of the LRMD and the SRD described with reference to FIGS. 20 and 21 may be constituted of time-series operations processed by the LRMD and the SRD described in FIGS. 1 through 19.

Therefore, the descriptions of the LRMD and the SRD described with reference to FIGS. 1 through 19 may be applied to the controlling method of the LRMD and the SRD according to an embodiment of the present invention.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A large range management device (LRMD) of managing a communication between a plurality of small range devices (SRDs) and a plurality of large range devices (LRDs), the SRDs and the LRDs being located in a single cell and having different transmission coverage, the LRMD comprising:
   an access slot allocation unit to allocate an SRD access slot to a radio resource for a downlink, to enable a first SRD to request an association from a network;
   a selection unit to select, from among the plurality of LRDs, a communication relay device for relaying relay data of the first SRD;

a relay slot allocation unit to allocate at least one SRD relay slot to a radio resource for an uplink, to enable the communication relay device to relay the relay data to a second SRD being located outside transmission coverage of the first SRD or another LRD being located outside the transmission coverage of the first SRD; and
a receiving unit to receive the relay data based on the at least one SRD relay slot;
an SRD slot allocation unit to allocate an SRD slot to the radio resource for the downlink, and to transmit the relay data to the communication relay device based on the SRD slot;
wherein the SRD allocation unit allocates the SRD slot to one of the radio resource for the downlink and the resource for the uplink when the first SRD requests a Peer-to-Peer (P2P) communication with a third SRD within the transmission coverage of the first SRD;
wherein the relay data includes information associated with a communication environment between the first SRD and the third SRD.

2. The LRMD of claim 1, wherein the selection unit selects the communication relay device based on at least one of information associated with a distance from the first SRD, channel state information, and data transmission capacities of the plurality of LRDs.

3. The LRMD of claim 1, wherein the relay slot allocation unit discriminates between the relay data and a relay request signal based on a signal type of at least one SRD relay slot.

4. The LRMD of claim 1, wherein:
the at least one SRD relay slot includes a plurality of partial slots; and
the communication relay device relays the relay data based on one of the plurality of partial slots.

5. The LRMD of claim 1, wherein the relay slot allocation unit includes the relay data in a data burst of the radio resource for the uplink.

6. An SRD (Short Range Device), comprising:
a relay request unit to transmit, to an LRMD (Large Range Management Device), a communication request signal requesting to communicate with a LRD (Long Range Device) being located outside a transmission coverage and/or another SRD being located outside the transmission coverage; and
a transmitting unit to receive an allocated radio resource for the downlink from the LRMD in response to the transmission, and to transmit relay data after performing synchronization with the allocated radio resource;
wherein the transmitting unit receives map data by performing synchronization with the downlink, and transmits, based on the map data, the relay data by including the relay data in an SRD relay slot from an LRD packet to the LRD or LRMD.

7. An LRD (Long Range Device), comprising:
a detector to detect whether a relay request signal from a first SRD (Short Range Device) exists in a radio resource for a downlink allocated by an LRMD (Large Range Management Device); and
a relay data transmitting unit to decode relay data to be transmitted to a second SRD being located outside a transmission coverage of the first SRD or another LRD being located outside the transmission coverage of the first SRD, and to transmit the decoded relay data to an SRD relay slot among radio resources for an uplink allocated by the LRMD when the relay request signal is detected;
wherein the relay data transmitting unit decodes and transmits the relay data after determining that an SRD access slot is allocated to the radio resource for the downlink;
wherein the relay data transmitting unit transmits the relay request signal to the second SRD or the other LRD based on at least one of a data burst of a radio resource of the LRD and the SRD relay slot.

8. An LRD (Long Range Device), comprising:
a resource allocation unit to allocate at least one SRD (Short Range Device) access slot, at least one SRD slot, and at least one SRD relay slot, to a packet of at least one of a time domain (TDM), a frequency domain (FDM), and a code domain (CDM); and
a transmitting unit to transmit, based on at least one SRD relay slot, relay data of a first SRD to a second SRD being located outside a transmission coverage of the first SRD or another LRD being located outside a transmission coverage of the first SRD;
wherein the relay data transmitting unit decodes and transmits the relay data after determining that an SRD access slot is allocated to the radio resource for the downlink;
wherein the relay data transmitting unit transmits the relay request signal to the second SRD or the other LRD based on at least one of a data burst of a radio resource of the LRD and the SRD relay slot.

9. The LRD of claim 8, wherein the resource allocation unit allocates the at least one SRD slot to the first SRD when a relay request signal or the relay data is received through the at least one SRD access slot.

10. A method of controlling an LRMD (Large Range Management Device) that manages a communication between a plurality of SRDs (Short Range Devices) and a plurality of LRDs (Long Range Devices), the SRDs and the LRDs being located in a single cell and having different transmission coverage, comprising:
allocating an SRD access slot to a radio resource for a downlink, to enable a first SRD to request an association from a network;
selecting, from among the plurality of LRDs, a communication relay device for relaying relay data of the first SRD;
allocating at least one SRD relay slot to a radio resource for an uplink, to enable the communication relay device to relay the relay data to a second SRD being located outside the transmission coverage of the first SRD or another LRD being located outside the transmission coverage of the first SRD; and
receiving, from the communication relay device, the relay data based on the at least one SRD relay slot;
an SRD slot allocation unit to allocate an SRD slot to the radio resource for the downlink, and to transmit the relay data to the communication relay device based on the SRD slot;
wherein the SRD allocation unit allocates the SRD slot to one of the radio resource for the downlink and the resource for the uplink when the first SRD requests a Peer-to-Peer (P2P) communication with a third SRD within the transmission coverage of the first SRD;
wherein the relay data includes information associated with a communication environment between the first SRD and the third SRD.

11. The method of claim 10, wherein the selecting of the communication relay device comprises:
selecting the communication relay device based on at least one of information associated with a distance from the first SRD, channel state information, and data transmission capacities of the plurality of LRDs.

12. The method of claim 10, further comprising:
  forming the at least one SRD relay slot with a plurality of partial slots; and
  relaying the relay data based on one of the plurality of partial slots.

13. A method of controlling an SRD (Short Range Device), comprising:
  transmitting, to an LRMD (Large Range Management Device), a signal requesting to communicate with an LRD (Long Range Device) being located outside a transmission coverage and with another SRD being located outside the transmission coverage;
  receiving a radio resource for a downlink allocated from the LRMD in response to the transmission; and
  transmitting, to the LRMD, relay data after performing synchronization with the allocated radio resource;
  wherein the transmitting unit receives map data by performing synchronization with the downlink, and transmits, based on the map data, the relay data by including the relay data in an SRD relay slot from an LRD packet to the LRD or LRMD.

\* \* \* \* \*